United States Patent [19]

Castellucci et al.

[11] 4,360,614

[45] Nov. 23, 1982

[54] BASE SOLUBILIZATION OF AN AZOLE-FUNCTIONAL RESIN AND ELECTRODEPOSITION OF SUCH SOLUBILIZED RESIN

[75] Inventors: Nicholas T. Castellucci, Pittsburgh; John F. Grunewalder, Glenshaw, both of Pa.; John S. Ostrowski, Richardson, Tex.

[73] Assignee: PPG Industries Inc., Pittsburgh, Pa.

[21] Appl. No.: 229,495

[22] Filed: Jan. 29, 1981

[51] Int. Cl.$^3$ .............................................. C08L 63/02
[52] U.S. Cl. ................................... 523/421; 524/901; 525/523; 528/109
[58] Field of Search ................. 528/109, 374; 525/523; 260/29.2 EP; 523/414, 421; 524/901; 204/181 C

[56] References Cited

U.S. PATENT DOCUMENTS 3,753,956  8/1973  Tuites et al. ................... 260/78.4 R
3,903,048  9/1975  Lombardi et al. .................. 525/523

FOREIGN PATENT DOCUMENTS 54-4152100  11/1979  Japan.

Primary Examiner—Theodore E. Pertilla
Attorney, Agent, or Firm—Thomas M. Breininger

[57] ABSTRACT

Disclosed is a method of imparting water solubility or dispersibility to the reaction product of a polyepoxide and a mercapto-substituted triazole, a mercapto substituted tetrazole or a mixture thereof, by admixture with a base in an amount at least sufficient to water solubilize the azole-functional reaction product.

Also disclosed is a method of using the above water solubilized reaction product in an electrodeposition process.

8 Claims, No Drawings

BASE SOLUBILIZATION OF AN AZOLE-FUNCTIONAL RESIN AND ELECTRODEPOSITION OF SUCH SOLUBILIZED RESIN

BACKGROUND OF THE INVENTION

The use of organic solvents for organic polymeric resins in the coatings and resins industry presents a number of problems such as fire hazards, toxicity problems and atmospheric pollution. Additionally, being generally derived from petroleum based materials, organic solvents increase the cost of coating compositions; yet generally do not form part of the final film.

Water based coating compositions do not present the above problems nearly to the same degree as organic solvents. Thus there has arisen an increased need for a wider variety of water soluble or water dispersible polymeric organic resins. Water soluble or dispersible polymeric resins can be especially useful in electrodeposition (electrocoating) processes. The incorporation of carboxyl groups into a polymer with subsequent neutralization by an organic or inorganic base is probably the most common way to impart water solubility or dispersibility to the polymer. For example, it is known to copolymerize acrylates with monomers bearing carboxyl groups to provide carbonyl functionality to the acrylic resin and to at least partially neutralize the carboxyl groups with base. However, depending on the intended use, the presence of carboxyl groups and/or carboxylate groups in the polymer may be undesirable.

Applicants' U.S. Pat. No. 4,322,459 discloses novel resins which are the reaction products of mercapto substituted triazoles or tetrazoles.

SUMMARY OF THE INVENTION

The present invention is directed to a method of imparting water solubility or dispersibility to the ungelled reaction product of a polyepoxide and a N-heterocyclic compound selected from a mercapto substituted triazole, a mercapto substituted tetrazole or a mixture thereof, by admixture with a base in an amount sufficient to impart water solubility or dispersibility to the azole-functional reaction product. The polyepoxide/N-heterocyclic reaction products (hereinafter designated "resins" for convenience) for use in the present invention generally contain substantially no carboxyl groups, and preferably no carboxyl groups.

The present invention also is directed to the use of these watersolubilized or dispersed resins in electrodeposition processes, especially where the substantial exclusion of carboxyl or carboxylate groups in the resin to be electrodeposited is desired. It is to be understood that the base "solubilized" resins referred to herein include both aqueous solutions and dispersions of these resins.

DETAILED DESCRIPTION OF THE INVENTION

The invention comprises mixing an ungelled reaction product of a polyepoxide and a N-heterocyclic compound selected from the group consisting of a mercapto substituted triazole, a mercapto substituted tetrazole and a mixture thereof with a base in an amount sufficient to impart water solubility or dispersibility to the reaction product. These reaction products are obtained by reacting the N-heterocyclic compound and polyepoxide in a ratio of equivalents respectively of from about 0.5 to 1.0 to about 1.5 to 1.0, preferably from about 0.9 to 1.0 to about 1.1 to 1.0.

The N-heterocyclic compound for the production of the base solubilized resins is selected from the group consisting of a triazole, a tetrazole and a mixture thereof, the N-heterocyclic compound substituted on at least one carbon atom in the N-heterocyclic ring by at least one group of the formula $-(-X-)_n SH$ wherein X represents an alkylene group containing from 1 to 6 carbon atoms optionally halogen substituted, a cycloalkylene group containing from 5 to 8 carbon atoms optionally halogen substituted, or a phenylene group optionally substituted by halogen and/or an alkyl group containing from 1 to 6 carbon atoms, and n represents 0 or 1, preferably 0.

Examples of tetrazoles which may be reacted with the polyepoxides to form the water soluble resins for the present invention include: 5-mercaptotetrazole, 5-mercaptomethyltetrazole, 5-mercaptoethyltetrazole, 5-mercaptopropyltetrazole, and mixtures thereof.

A preferred class of azoles are the triazoles containing the previously described substituents. The triazoles may be substituted, for example, by optionally halogen substituted lower alkyl groups having from 1 to 6 carbon atoms and optionally halogen substituted cycloalkyl groups containing from 5 to 8 carbon atoms. Examples of mercapto substituted triazoles suitable for the invention include: 3-mercapto-1,2,4-triazole; 5-mercapto-1,2,4-triazole; 4-mercapto-1,2,3-triazole; 3-mercaptomethyl-1,2,4-triazole; 3-mercaptoethyl-1,2,4-triazole; 5-mercaptomethyl-1,2,4-triazole; 5-mercaptoethyl-1,2,4-triazole; 4-mercaptomethyl-1,2,3-triazole; 4-mercaptoethyl-1,2,3-triazole; or mixtures thereof.

The polyepoxide used to form the water soluble resins for the method of the invention is a compound or a mixture of compounds containing more than one 1,2-epoxy group of the formula

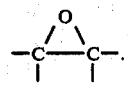

As used herein an epoxide equivalent is the weight of polyepoxide in grams which contains 1 gram-equivalent of epoxy groups. For example, if a polymeric epoxide resin chain is assumed to be linear with no side branching and one epoxy group terminates each end, no other epoxy groups being present, the epoxide equivalent (weight) would be one half of the average molecular weight of the resin. In other words, one equivalent of polyepoxide would contain 1 mole of 1,2-epoxy groups.

As used herein, an equivalent of N-heterocyclic groups represents one mole of N-heterocyclic moieties. An equivalent of N-heterocyclic group containing compound is the weight of the compound in grams which contains one mole of N-heterocyclic moieties.

Whenever used herein, an equivalent weight of N-heterocyclic group containing resin is the calculated weight in grams which contains one mole of N-heterocyclic moieties. For example, if 125 grams of an epoxide functional resin having an epoxide equivalent weight of 500 (therefore 0.25 equivalents) were reacted with 25 grams (0.25 equivalents) of 3-mercapto-1,2,4-triazole which has a molecular weight of 101 and may be represented by the formula

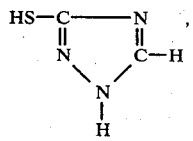

the calculated equivalent weight of the product would be 601 (i.e., 500+101). Thus an equivalent of such a N-heterocyclic group containing resin would correspond to 601 grams of the N-heterocyclic group containing resin.

A number of polyepoxides are known, examples of which are described in the *Handbook of Epoxy Resins*, Henry Lee and Kris Neville, 1967, McGraw Hill Book Company. The polyepoxides may be saturated or unsaturated, aliphatic, cycloaliphatic, aromatic or heterocyclic and may be substituted with substituents such as chlorine, hydroxyl groups, and the like. The polyepoxides may be monomeric or polymeric.

Some preferred polyepoxides are the polyglycidyl ethers of polyphenols such as 2,2-bis (4-hydroxyphenyl) propane commonly known as bisphenol-A. These polyglycidyl ethers may be prepared, for example, by etherification of a polyphenol with epichlorohydrin or dichlorohydrin in the presence of an alkali. Examples of preferred polyphenols include: 1,1-bis (4-hydroxyphenyl) ethane; 2,2-bis (4-hydroxyphenyl) propane; 1,1-bis (4-hydroxyphenyl) isobutane; 2,2-bis (4-hydroxytertiarybutylphenyl) propane; bis (2-hydroxynaphthyl) methane; 1,5-dihydroxynaphthalene; 1,1-bis-(4-hydroxy-3-allylphenyl) ethane and the like.

The preferred polyglycidyl ethers of polyphenols also include the polymeric epoxy resins of various molecular weights which may be produced for example by varying the mole ratio of epichlorohydrin to polyphenol in known manner. When polyepoxides which are polyglycidyl ethers of polyphenols are used in the invention, they generally have average molecular weights ranging from about 300 to about 8000, preferably from about 300 to about 2000 and epoxy equivalent weights ranging from about 150 to about 4000, preferably from about 150 to about 1000. Examples of such polymeric epoxy resins particularly include EPON 1001 (a polyglycidyl ether of bisphenol A having an average molecular weight of about 1000 and an epoxide equivalent weight of about 500), EPON 828 (a polyglycidyl ether of bisphenol A having an average molecular weight of about 380 and an epoxide equivalent weight of about 190) and EPON 812 (a polyglycidyl ether of bisphenol A having an average molecular weight of about 310 and an epoxide equivalent weight of about 160), all three polymeric epoxy resins available from the Shell Oil Company.

Suitable polyepoxides also include the polyglycidyl ethers of mononuclear polyhydric phenols such as the polyglycidyl ethers of resorcinol, pyrogallol, hydroquinone, and pyrocatechol.

Processes for the preparation of polyglycidyl ethers of polyhydric phenols are known and are described, for example, in U.S. Pat. Nos. 2,506,486 and 2,943,095.

Also suitable are the generally known polyglycidyl ethers of polyhydric alcohols such as the reaction products of epichlorohydrin or dichlorohydrin with aliphatic or cycloaliphatic compounds containing from two to four hydroxyl groups including, for example, ethylene glycol, diethylene glycol, triethylene glycol, dipropylene glycol, tripropylene glycol, propane diols, butane diols, pentane diols, glycerol, 1,2,6-hexanetriol, pentaerythritol and 2,2-bis (4-hydroxycyclohexyl) propane. Examples of methods for preparing polyglycidyl ethers of polyhydric alcohols are described in U.S. Pat. No. 2,898,349.

Also useful are the polyepoxides derived from the epoxidation of an olefinically unsaturated alicyclic compound. These polyepoxides are non-phenolic and may be obtained by epoxidation of alicyclic olefins, for example, by oxygen and selected metal catalysts, by perbenzoic acid, by acetaldehyde monoperacetate or by peracetic acid. Among such polyepoxides are the epoxy alicyclic ethers and esters generally known in the art.

Polyepoxides containing oxyalkalene groups may also be used in the invention. Such oxyalkalene groups are typically groups of the formula:

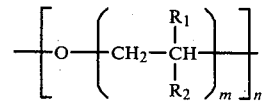

wherein $R_1$ and $R_2$ independently represent hydrogen or an alkyl group, preferably a lower alkyl group (such as one having from 1 to 6 carbon atoms) and wherein m is from 1 to 4 and n is from 2 to 50. The oxyalkylene groups may be part of the main polyepoxide chain itself or pendant to the main polyepoxide chain. Polyepoxides containing oxyalkylene groups are generally known and may be prepared, for example, by reacting some of the epoxy groups of a polyepoxide such as the epoxy resins mentioned above with an alcohol containing oxyalkylene groups.

In addition to the polyepoxide resins described above, addition polymerized polymers containing epoxy groups may also be used in the invention. These polyepoxides may be produced by the copolymerization of a wide variety of generally known polymerizable vinyl monomers including for example, glycidyl acrylate, glycidyl methacrylate and allyl glycidyl ether. These epoxy functional monomers may be copolymerized with any monomers containing at least one $CH_2=C<$ group, preferably in terminal position, and which do not contain a group reactive with the epoxy group under the conditions for addition polymerization. Suitable comonomers include for example: polymerizable monolefinic compounds such as styrene, alpha-methyl styrene, alpha-ethyl styrene, vinyl toluene, t-butyl styrene and allyl alcohol; halogenated mono-olefinic hydrocarbons such as alpha-chlorostyrene, alpha-bromostyrene, 2,5-dichlorostyrene, 2,5-dibromostyrene, 3,4-difluorostyrene, ortho-, meta-, and para-fluorostyrenes, 2,6-difluorostyrene, 3-fluoro-4-chlorostyrene, 2,4,6-trichlorostyrene and dichloromonofluorostyrenes; unsaturated carboxylic acid amides such as acrylamide and methacrylamide; unsaturated nitriles such as acrylonitrile, methacrylonitrile, ethacrylonitrile, 3-octenenitrile; and esters of acrylic acids such as ethyl methacrylate, isopropyl methacrylate, isobutyl methacrylate and isobornyl methacrylate.

Preferred addition polymerized polymers containing epoxy groups are acrylic polymers containing pendant or terminal epoxy groups and substantially no carboxyl groups, preferably no carboxyl groups, which may be prepared for example by the addition polymerization of compounds or mixtures of compounds such as glycidyl acrylate, glycidyl methacrylate and allyl glycidyl ether.

Additionally, the reaction products of the polymeric polyepoxides and the N-heterocyclic materials containing at least two groups reactive with epoxy moieties, usually hydrogen atoms, and containing —CO—NH— moieties preferably —NH—CO—NH— moieties as described in U.S. Pat. No. 4,110,287 may also be used in the present invention. So much of the disclosure of U.S. Pat. No. 4,110,287 as pertains to these polyepoxides is hereby incorporated by reference.

The resins suitable for the method of the invention may be produced by the reaction of the N-heterocyclic compounds and the polyepoxides in a ratio of equivalents of N-heterocyclic compound to polyepoxide of from about 0.5:1.0 to about 1.5:1.0 respectively, preferably from about 0.9:1.0 to about 1.1:1.0, and most preferably in an equivalent ratio of 1.0:1.0. The temperature of the reaction may vary but generally ranges from about 90° C. to about 140° C. An organic solvent generally is included in the reaction mixture to facilitate control of the reaction. Many suitable solvents or mixtures of solvents may be used. Examples of suitable solvents include: the mono- and dialkyl ethers of ethylene and propylene glycol such as ethylene glycol monoethyl ether, ethylene glycol monobutyl ether, ethylene glycol dibutyl ether, ethylene glycol monoethyl ether acetate, ethylene glycol monohexyl ether acetate, propylene glycol monoethyl ether and propylene glycol dibutyl ether, and the mono-and dialkyl ethers of diethylene glycol such as diethylene glycol monoethyl ether, diethylene glycol dibutyl ether, diethylene glycol diethyl ether and diethylene glycol monobutyl ether acetate.

The resins generally used in the method of the present invention are substantially clear, slightly colored liquids which have pot lives at room temperature of at least 6 months, typically at least 12 months.

Water solubility or dispersibility may be imparted to the resins produced from the reaction of polyepoxides and mercapto-substituted N-heterocyclic compounds by mixing the resin with an inorganic or organic base in an amount sufficient to impart solubility or dispersibility. The amount of base will vary depending, for example, on the average molecular weight of the resin and the number of equivalents of the N-heterocyclic groups it contains. Typically resins containing at least 3 percent by weight of N-heterocyclic groups may be base solubilized by the method of the invention.

A wide variety of organic and inorganic bases may be used to water solubilize these resins, examples of which include: ammonium hydroxide, sodium hydroxide, potassium hydroxide, amines such as dimethylethanolamine and triethylamine, and mixtures thereof. The base solubilization may be carried out either by slowly adding the base to the resin or slowly adding the resin to the base so as to impart water solubility or dispersibility to the resin. Typically, base solubilization of the resin is carried out by slow addition of the base to the resin followed by slow addition of water to the mixture.

The method of the invention thus provides a distinct advantage over generally known methods of water solubilizing resins in that the present method does not require the presence of carboxyl and/or carboxylate groups in the resin to effect stabilization of the resin in an aqueous medium.

Resins which have been base solubilized according to the invention are useful, for example, as scavengers for metal ions, such as $Zn^{+2}$ and $Cu^{+2}$, which are capable of forming insoluble precipitates with the azole-functional resins.

These aqueous, base solubilized resins are particularly useful in anodic electrocoating (electrodeposition) processes whereby an adherent film of the azole-functional resin is electrodeposited by means of a direct electric current on an article serving as the anode in generally known equipment for electrocoating resins. The method of the present invention generally comprises contacting the article which serves as the anode with an aqueous mixture of a resin comprising the previously described reaction product of N-heterocyclic compound and polyepoxide which has been solubilized by admixture with a base in an amount at least sufficient to impart water solubility to such reaction product, and passing a direct current of electricity through the aqueous mixture between the article and a cathode thereby electrodepositing an adherent film on the article. The article is then withdrawn from the bath, usually rinsed, and then the film is baked in a conventional manner.

Without intending to be limited by any particular theory of operation, it is believed that the base (herein represented as B), which is used to solubilize a resin containing N-heterocyclic groups useful in electrodeposition, reacts with a hydrogen atom directly attached to a nitrogen atom in the N-heterocyclic ring to produce a positive ion, $BH^+$, and an anion of resin. It is the discharge at the anode of anions so produced by the base solubilization process which is believed to account for the deposition of an adherent film on the article comprising the anode.

The conditions under which the electrodeposition of the base solubilized resins is carried out are those conventionally used in electrodeposition of coatings. The applied voltage may be varied greatly and can be, for example, as low as 1 volt or as high as several thousand volts, although typically between 50 volts and 500 volts and preferably between 100 and 250 volts.

The concentration of the non-volatile components (i.e., base solubilized resin and any pigments and the like) in the aqueous electrodeposition bath is not critical and relatively high levels can be employed. However, it is ordinarily desirable to use as low a concentration as gives satisfactory results. Generally, aqueous compositions containing as little as 1 percent by weight of non-volatile solids can be employed, with those containing between 5 percent and 20 percent by weight being preferred.

The base solubilized resins used in the method of the invention may be electrodeposited on any conductive substrate or any substrate which contains at least an electrically conductive coating. Such an electrically conductive coating is described, for example, in U.S. Pat. No. 3,674,670.

Electrodepositable coating compositions comprising the above base solubilized resins may contain, when desired, one or more pigments and various additives such as anti-oxidants, surface active agents, antifoaming agents, bactericides and the like. The pigment may be of any conventional type suitable for incorporation in an electrodeposition bath, including, for example, iron oxides, lead oxides, strontium chromate, carbon black, titanium dioxide and barium sulfate, as well as color pigments such as cadmium yellow, cadmium red, chromic yellow, phthalocyanine blue and the like. The weight ratio of pigment solids to base solubilized resin solids in the aqueous electrodepositable compositions generally is not higher than 1.5 to 1. Coating compositions containing the base solubilized resins when employed for electrodeposition usually contain at least about 80 percent by weight water.

The current density which may be employed in electrodeposition of the base solubilized resins is usually between 0.1 ampere and 15 amperes per square foot (0.093 square meter).

Electrodepositable compositions while referred to as "solubilized," in fact are considered a complex solution, dispersion or suspension or combination of one or more of these classes in water, which acts as an electrolyte under the influence of an electric current. While, no doubt, in some circumstances the base solubilized resin is in solution, it is clear that in some instances, and perhaps in most, the base solubilized resin is a dispersion between a colloidal suspension and a true solution.

The invention is illustrated by the following Examples. Quantities and percentages are by weight unless stated otherwise. When used herein, "pbw" means "parts by weight."

EXAMPLE 1

(a) A 1,2 epoxide-functional resin having an epoxide equivalent weight of 976 was prepared by reacting 20% glycidyl methacrylate, 50% methyl methacrylate, and 30% ethyl acrylate in ethylene glycol monoethyl ether. The resultant product containing epoxide-functional resin has a 47.8% by weight solids content.

A 500 ml flask is equipped with a mechanical stirrer, dropping funnel, condenser, nitrogen inlet, and heating mantle. 220 g (0.108 equivalents) of the epoxide functional resin product is added dropwise over three to four hours to the 500 ml flask which has been preheated to 90° C. and contains 10 g (0.108 equivalents) of 3-mercapto-1,2,4 triazole dissolved in 85 ml of ethylene glycol monoethyl ether. The resultant product containing triazole-functional resin has a solids content of 41.7% by weight.

The triazole-functional resin has a calculated azole-equivalent weight of 1077 (i.e., 1077 g of resin would contain 1 mole of triazole groups).

(b) While stirring, 0.9 g of aqueous, 28% by weight ammonia water is added to 10 g of the above product containing triazole-functional resin (41.7% solids). Next water is added slowly while stirring to form an aqueous solution. Large additional amounts of water can be added and the resin remains in solution.

EXAMPLE 2

(a) In a manner similar to that described in EXAMPLE 1(a) above, a triazole-functional resin having a calculated azole-equivalent weight of 1170 is prepared from 3-mercapto-1,2,4-triazole dissolved in ethylene glycol monoethyl ether and a 1,2-epoxide functional resin prepared from 15% glycidyl methacrylate, 50% ethyl acrylate, 10% methyl methacrylate and 25% styrene. The product containing the triazole functional resin has a 59.2% by weight solids content.

(b) While stirring, 11.5 g of dimethylethanolamine is mixed with 50.7 g of the product of part (a) immediately above. Next water is slowly added to this mixture while stirring to form an aqueous solution. Large additional amounts of water can be added and the resin remains in solution.

EXAMPLE 3

(a) A 500 ml reaction flask is charged with 25 g (0.25 mole) of 3-mercapto-1,2,4-triazole and 75 ml of ethylene glycol monoethyl ether. The flask is equipped with an addition funnel, stirrer, condenser, thermometer and heating mantle. The mixture is heated to 100° C. and 240 g (0.257 mole) of a 50% solids solution in ethylene glycol monoethyl ether of a polyphenol, available from Shell Chemical Co. as EPON 1001 (average Molecular Weight of about 1000, and epoxide equivalent weight of about 500) is added over a 1½ hour period. The temperature is maintained at about 100° C. during the addition. The reaction mixture is stirred for an additional 3 hours until the reaction is complete. The resultant product contains 52.5% solids and is a clear, pale yellow, homogeneous fluid containing triazole-functional resin having a calculated azole-equivalent weight of about 606.

(b) To 57.2 g of the product containing 52.5% solids of part (a) immediately above, 25 g of dimethylethanolamine is added while stirring. Next water slowly is added while stirring to yield a stable, milky white dispersion.

EXAMPLE 4

(a) A 500 ml reaction flask is charged with 20 g (0.20 mole) of 3-mercapto-1,2,4-triazole and 50 ml of ethylene glycol monoethyl ether and heated to 90° C. Then 158.7 g (0.10 mole) of a 63% solids solution in ethylene glycol monoethyl ether of EPON 1001 (average Molecular Weight of about 1000, and epoxide equivalent weight of about 500) is added dropwise to the flask with stirring while the temperature is maintained at about 90° C. After the addition of EPON 1001 is complete, the temperature is allowed to fall to about 70° C. and thereafter maintained at this temperature for about 12 to 14 hours. The resultant product has a 52.5% solids content and contains triazole-functional resin having a calculated azole-equivalent weight of about 601.

(b) To 57.2 g of the product containing 52.5% solids of part (a) immediately above, 26.58 g of dimethylethanolamine is added while stirring. Then water slowly is added while stirring to yield a stable, milky white aqueous dispersion containing 10% by weight of the base solubilized resin.

(c) The 10% by weight dispersion of part (b) immediately above is placed in a glass container with a metal electrode as a cathode and a steel panel as an anode. The electrodes are connected to a source of direct current through current and voltage controlling device. A current of 2.5 amperes is applied to the electrodes and is kept constant for about 20 seconds until the voltage reaches 200 volts whereupon the voltage is kept constant for about 70 sec and the current is allowed to drop to about 0.1 to 0.5 amperes. The total time that current flows in the circuit is 90 seconds. During the 90 seconds, an adherent film of resin is deposited on the anode (steel panel) from the 10% by weight aqueous dispersion of the base solubilized resin.

The coating on the panel is then oven cured to produce a dry film of 1 mil thickness having excellent morphological characteristics such as smooth surface and absence of holes.

What is claimed is:

1. A method of imparting water solubility or dispersibility to a reaction product comprising: mixing the reaction product with a base and water, the amount of base being sufficient to impart water solubility or dispersibility to the reaction product, wherein the product results from the reaction of
    (A) a N-heterocyclic compound selected from the group consisting of a triazole, a tetrazole and a mixture thereof, said N-heterocyclic compound substituted on at least one carbon atom in the N-heterocyclic ring by a group of the formula $-(X)_n SH$ wherein X represents an alkylene group containing from 1 to 6 carbon atoms optionally halogen substituted, a cycloalkylene group containing from 5 to 8 carbon atoms optionally halogen substituted, or a phenylene group optionally substituted by halogen and/or an alkyl group containing from 1 to 6 carbon atoms, and n represents 0 or 1, and (B) a polyepoxide containing 1,2-epoxy groups, wherein the ratio of equivalents of said N-heterocyclic compound to epoxide equivalents of said polyepoxide is from about 0.5:1.0 to about 1.5:1.0.

2. The method of claim 1 wherein said reaction product contains substantially no carboxyl groups.

3. The method of claim 2 wherein said polyepoxide is a polyglycidyl ether of a polyphenol and/or an acrylic resin containing epoxy groups.

4. The method of claim 3 wherein said polyglycidyl ether is a polyglycidyl ether of 2,2-bis (4-hydroxyphenyl) propane.

5. The method of claims 1, 2, 3 or 4 wherein said N-heterocyclic compound is a triazole.

6. The method of claim 5 wherein the ratio of equivalents of said N-heterocyclic compound to epoxide equivalents of said polyepoxide is from about 0.9 to 1.0 to about 1.1 to 1.0 and n represents 0.

7. The method of claim 5 wherein said triazole is selected from the group consisting of 3-mercapto-1,2,4-triazole, 5-mercapto-1,2,4-triazole, 4-mercapto-1,2,3-triazole and a mixture thereof.

8. The method of claim 7 wherein said base is selected from the group consisting of ammonium hydroxide, an amine, potassium hydroxide, sodium hydroxide and a mixture thereof.

* * * * *